US008374947B2

(12) United States Patent
Farrell et al.

(10) Patent No.: US 8,374,947 B2
(45) Date of Patent: Feb. 12, 2013

(54) DERIVATIVES TRADING METHODS THAT USE A VARIABLE ORDER PRICE AND A HEDGE TRANSACTION

(75) Inventors: James W. Farrell, Carol Stream, IL (US); Agnes Shanti Thiruthuvadoss, Chicago, IL (US); David Salvadori, Bartlett, IL (US); Scott Johnson, Oak Park, IL (US); John Falck, Chicago, IL (US); Charlie Troxel, Jr., Naperville, IL (US); Arjuna Ariathurai, Chicago, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 422 days.

(21) Appl. No.: 11/931,609

(22) Filed: Oct. 31, 2007

(65) Prior Publication Data

US 2008/0052223 A1 Feb. 28, 2008

Related U.S. Application Data

(60) Division of application No. 10/611,458, filed on Jul. 1, 2003, now Pat. No. 7,571,133, which is a continuation-in-part of application No. 10/385,152, filed on Mar. 10, 2003, now Pat. No. 7,152,041.

(51) Int. Cl.
*G06Q 40/00* (2006.01)
(52) U.S. Cl. .......................................................... 705/37
(58) Field of Classification Search ...................... 705/37
See application file for complete search history.

(56) References Cited

U.S. PATENT DOCUMENTS

| | | | |
|---|---|---|---|
| 5,649,116 | A | 7/1997 | McCoy |
| 5,799,287 | A | 8/1998 | Dembo |
| 5,924,082 | A | 7/1999 | Silverman |
| 5,950,176 | A | 9/1999 | Keiser |
| 6,014,643 | A | 1/2000 | Minton |
| 6,016,483 | A | 1/2000 | Rickard |
| 6,018,722 | A | 1/2000 | Ray |
| 6,061,662 | A | 5/2000 | Makivic |
| 6,112,189 | A | 8/2000 | Rickhard et al. |
| 6,195,647 | B1 | 2/2001 | Martyn |
| 6,236,972 | B1 | 5/2001 | Shkedy |
| 6,263,321 | B1 | 7/2001 | Daughtery, III |
| 6,282,521 | B1 | 8/2001 | Howorka |

(Continued)

FOREIGN PATENT DOCUMENTS

| | | |
|---|---|---|
| EP | 1178416 | 2/2002 |
| JP | 2003505794 | 2/2003 |

(Continued)

OTHER PUBLICATIONS

David G. McMillan, Alan E. H Speight, "Nonlinear dynamics in high frequency intraday financial data: Evidence for the UK long gilt futures market," The Journal of Futures Markets, Hoboken, Nov. 2002, vol. 22, Iss. 11, p. 1037.

(Continued)

*Primary Examiner* — Lindsay M. Maguire
(74) *Attorney, Agent, or Firm* — Banner & Witcoff, Ltd.

(57) ABSTRACT

Systems and methods are provided for executing a hedge transaction in connection with the execution of a derivative product order in which the price of the derivative product is defined by one or more variables. The hedge transaction may be executed at an exchange or match engine that is different from the exchange or match engine executing the derivative product order. The execution of derivative product transaction may be contingent on the existence of an appropriate hedge transaction. Alternatively, a best efforts approach may be used to fill the hedge transaction order after executing the derivative product transaction.

7 Claims, 8 Drawing Sheets

U.S. PATENT DOCUMENTS

| | | | |
|---|---|---|---|
| 6,317,727 B1 | 11/2001 | May | |
| 6,321,212 B1 | 11/2001 | Lange | |
| 6,347,307 B1 | 2/2002 | Sandhu | |
| 6,360,210 B1 | 3/2002 | Wallman | |
| 6,418,419 B1 | 7/2002 | Nieboer et al. | |
| 6,421,653 B1 | 7/2002 | May | |
| 6,505,174 B1 | 1/2003 | Keiser | |
| 6,616,725 B2 | 9/2003 | Cho | |
| 6,618,707 B1 | 9/2003 | Gary | |
| 6,622,129 B1 | 9/2003 | Whitworth | |
| 6,850,907 B2 | 2/2005 | Lutnick | |
| 7,024,387 B1 | 4/2006 | Nieboer et al. | |
| 7,089,204 B1 | 8/2006 | Nieboer et al. | |
| 7,117,833 B2 | 10/2006 | Spath | |
| 7,152,041 B2* | 12/2006 | Salavadori et al. | 705/36 R |
| 7,177,833 B1 | 2/2007 | Marynowski et al. | |
| 7,321,872 B1 | 1/2008 | Kaminsky et al. | |
| 7,418,422 B2 | 8/2008 | Burns | |
| 7,440,917 B2 | 10/2008 | Farrell et al. | |
| 7,567,499 B2 | 7/2009 | Nakamura et al. | |
| 7,567,932 B1* | 7/2009 | Salvadori et al. | 705/36 R |
| 7,571,133 B2* | 8/2009 | Farrell et al. | 705/37 |
| 7,672,899 B2* | 3/2010 | Farrell et al. | 705/37 |
| 7,778,911 B2 | 8/2010 | Salvadori et al. | |
| 7,890,418 B2 | 2/2011 | Farrell et al. | |
| 7,991,684 B2 | 8/2011 | Salvadori et al. | |
| 8,060,431 B2 | 11/2011 | Farrell et al. | |
| 8,160,949 B2 | 4/2012 | Johnston et al. | |
| 2001/0032163 A1 | 10/2001 | Fertik | |
| 2001/0034695 A1 | 10/2001 | Wilkinson | |
| 2001/0042036 A1 | 11/2001 | Sanders | |
| 2001/0044771 A1 | 11/2001 | Usher | |
| 2001/0056398 A1* | 12/2001 | Scheirer | 705/38 |
| 2002/0002530 A1 | 1/2002 | May | |
| 2002/0016760 A1 | 2/2002 | Pathak | |
| 2002/0046151 A1 | 4/2002 | Otero | |
| 2002/0049661 A1 | 4/2002 | Otero | |
| 2002/0065755 A1 | 5/2002 | Shlafman | |
| 2002/0069155 A1 | 6/2002 | Nafeh | |
| 2002/0073007 A1 | 6/2002 | Ayache | |
| 2002/0082967 A1 | 6/2002 | Kaminsky et al. | |
| 2002/0099651 A1 | 7/2002 | May | |
| 2002/0116317 A1 | 8/2002 | May | |
| 2002/0120542 A1 | 8/2002 | Higgins | |
| 2002/0128955 A1 | 9/2002 | Bradley | |
| 2002/0133456 A1 | 9/2002 | Lancaster | |
| 2002/0138390 A1 | 9/2002 | May | |
| 2002/0156719 A1 | 10/2002 | Finebaum | |
| 2002/0169703 A1 | 11/2002 | Lutnick et al. | |
| 2002/0174055 A1 | 11/2002 | Dick | |
| 2002/0174056 A1 | 11/2002 | Sefein | |
| 2002/0194115 A1 | 12/2002 | Nordlicht et al. | |
| 2003/0004853 A1 | 1/2003 | Ram | |
| 2003/0009419 A1 | 1/2003 | Chavez | |
| 2003/0023536 A1 | 1/2003 | Hollerman | |
| 2003/0028476 A1 | 2/2003 | Jenkins | |
| 2003/0033212 A1 | 2/2003 | Sandhu | |
| 2003/0033240 A1 | 2/2003 | Balson | |
| 2003/0046218 A1 | 3/2003 | Albanese | |
| 2003/0061148 A1 | 3/2003 | Alavian | |
| 2003/0069821 A1 | 4/2003 | Williams | |
| 2003/0069836 A1 | 4/2003 | Penney | |
| 2003/0074167 A1 | 4/2003 | Browne et al. | |
| 2003/0083978 A1 | 5/2003 | Brouwer | |
| 2003/0093347 A1 | 5/2003 | Gray | |
| 2003/0093360 A1 | 5/2003 | May | |
| 2003/0097328 A1 | 5/2003 | Lundberg et al. | |
| 2003/0101123 A1 | 5/2003 | Alvarado | |
| 2003/0101125 A1 | 5/2003 | McGill | |
| 2003/0115128 A1 | 6/2003 | Lange | |
| 2003/0195822 A1 | 10/2003 | Tatge | |
| 2003/0208430 A1 | 11/2003 | Gershon | |
| 2003/0216932 A1 | 11/2003 | Foley | |
| 2003/0220865 A1 | 11/2003 | Lutnick | |
| 2003/0220868 A1 | 11/2003 | May | |
| 2003/0225648 A1 | 12/2003 | Hylton | |
| 2003/0233308 A1 | 12/2003 | Lundberg et al. | |
| 2003/0236737 A1 | 12/2003 | Kemp, III | |
| 2004/0006534 A1* | 1/2004 | Fung | 705/38 |
| 2004/0044613 A1 | 3/2004 | Murakami et al. | |
| 2004/0064393 A1 | 4/2004 | Luenberger | |
| 2004/0083158 A1 | 4/2004 | Addison | |
| 2004/0083165 A1 | 4/2004 | Lawrence | |
| 2004/0148249 A1* | 7/2004 | Kinnear | 705/37 |
| 2004/0172355 A1 | 9/2004 | Pandher | |
| 2004/0199455 A1 | 10/2004 | Saliba | |
| 2004/0199459 A1* | 10/2004 | Johnston et al. | 705/38 |
| 2004/0267655 A1 | 12/2004 | Davidowitz et al. | |
| 2005/0160024 A1 | 7/2005 | Soderborg | |
| 2005/0260492 A1 | 11/2005 | Tucholski et al. | |
| 2006/0160024 A1 | 7/2006 | Barr | |
| 2006/0184447 A1 | 8/2006 | Nieboer et al. | |
| 2008/0091584 A1* | 4/2008 | Johnson et al. | 705/36 R |
| 2009/0119201 A1 | 5/2009 | Burns et al. | |
| 2009/0265267 A1 | 10/2009 | Johnston et al. | |
| 2010/0094746 A1 | 4/2010 | Macgregor et al. | |
| 2010/0306133 A1 | 12/2010 | Johnston et al. | |
| 2011/0270737 A1 | 11/2011 | Johnston et al. | |
| 2012/0030090 A1 | 2/2012 | Johnston et al. | |
| 2012/0041896 A1 | 2/2012 | Johnston et al. | |

FOREIGN PATENT DOCUMENTS

| | | |
|---|---|---|
| WO | 02089027 | 11/2002 |
| WO | 03001325 | 1/2003 |
| WO | 03034297 | 4/2003 |
| WO | 2004/008274 | 1/2004 |
| WO | 2004081737 | 9/2004 |

OTHER PUBLICATIONS

Miller, Merton, "Financial Innovations and Market Volatility", Chapter 11, 1991.

Wohl, Avi, "Implications of an Index-Contingent Trading Mechanism", Journal of Business, vol. 70, No. 4, 1997.

"Record Volume on ITG Trading Desk", ITG Connect, Spring 1996.

Schellhorn, Henry, "Combination Trading with Limit Orders", Journal of Applied Mathematics & Decision Sciences, pp. 133-150, 1997.

"Securities and Exchange Commission Notice", Federal Register, vol. 59, No. 24, Feb. 4, 1994.

Downes, John, "Dictionary of Finance and Investment Terms", 1985.

POSIT Volume History, http://www.itginc.com/itg_posit_vol_hist.html, ITG POSIT Keeps growing, Aug. 20, 1998, 3 pages.

ITG Products, http://www.itginc.com/products.html, Aug. 19, 1998, 1 page.

ITG POSIT, http://www.itginc.com/products/pos_works.html, Aug. 20, 1998, 1 page.

ITG POSIT, http://www.itginc.com/products/pos_advan.html, Aug. 20, 1998, 2 pages.

ITGI's 1995 Third Quarter Results, ITG Press Release Oct. 9, 1998, http://www.itginc.com/itg_press_rel1.html, Aug. 20, 1998, 2 pages.

ITGI's 1995 Fourth Quarter Results: Record Earnings, ITG Press Release Jan. 23, 1996, http://www.itginc.com/4qpress.html, Aug. 20, 1998, 3 pages.

ITG Press Release—Dec. 9, 1996, http://www.itginc.com/presindi.html, Aug. 19, 1998, 2 pages.

ITG POSIT, The worlds largest Intra-day trade matching system, http://www.itginc.com/products/posit.html, Aug. 19, 1998, 2 pages.

Record Trading Desk Volume, ITG Connect—Spring 96, http://www.posit.com/4con_02.html, Aug. 20, 1998, 3 pages.

Robert A. Schwartz, "Reshaping the Equity Markets, A Guide for the 1990's", Harper Business, 1991, 7 pages.

Oct. 15, 1993—"the Chicago Basket" (CXM Basket), Letter, 21 pages.

"Trading on the Frontier", Plan Sponsor, Oct. 1996, 8 pages.

"Optimark Technologies to Announce Trading System Aimed at Institutions", The Wall Street Journal, Sep. 24, 1996, 1 page.

"Great Expectations", Howard Banks, Forbes, Dec. 2, 1996, 3 pages.

Bleakly, "Firms Approach Hedges with Caution", Asian Wall Street Journal. New York, NY, Aug. 18, 1993, p. 1.

Lee, "Industry Standard Sought for Valuing Options", Euromoney. London: May 1993, p. 48, 2 pages.

Downes, et al., Dictionary of Finance and Investment Terms, Barrons Educational Services, 1998, pp. 27-28.

(Ross) Derek, "Controlling Derivatives", Accountancy, London: Mar. 1995, vol. 115, Issue 1219, p. 138.

Zeto, "Pricing and Hedging American Fixed-Income Derivatives with Implied Volatility Structures in Two-Factor HealthMarrow-Morton Model", The Journal of Future Markets. Hoboken. Sep. 2002, vol. 22, Issue 9, p. 839.

Agarwal, "Defining Parameters of an Underling Variable (Asset/Value) and Establish Water Table as Underlying Value", Finance India. Delhi: Dec. 2002, vol. 16, Issue 4, p. 1273.

Ritchie, Abstract, "Why Market Maker Position Limits Should be Delta-Based", Futures, vol. 17, No. 9, p. 42(2), Aug. 1988; UMI Publication No. 00415047.

Meyer, "Calculation and Comparison of Delta-Neutral and Multiple-Greek Dynamic Hedge Returns Including of Market Frictions", Department of Commerce, International Review of Economics and Finance; 12 (2003), pp. 207-235.

Temple, et al., World Reporte™; Investors Chronicle; Dec. 11, 1998, Copyright @ 1998 Investors Chronicle, pp. 62.

Holter, "It's Liquidity Stupid", CBOE Ups S&P Limits; www.futuresmag.com; Nov. 1996.

Kawaller, "A Novel Approach to Transactions-Based Currency Exposure Management", Financial Analysts Journal, Nov./Dec., 1992; 48, 6; p. 79.

"S&P. ComStock/Micro Hedge Windows: Results Rooted in Reliability", Futures (Cedar Falls, Iowa); Annual 1993, vol. 22, No. 7, p. 26(1); Copyright Oster Communications Inc. 1993.

Carandang, "Derivative Portfolio Risk Management Using a Value-At-Risk Framework", Proceedings of the IEEE/IAFE 1997, Computational Intelligence for Financial Engineering (CIFEr) (Cat. No. 97TH8304), Inclusive p. Nos. 260-5, New York, NY 1997.

International Search Report and Written Opinion for PCT/US04107064 dated May 31, 2005.

Examination Report in EP 04718565.7 dated Sep. 2, 2008.

Office Action with English translation in JP2006-506956 dated Jul. 21, 2009.

Document attached to Notice of Allowance dated Mar. 19, 2009, from file history of U.S. Appl. No. 10/611,458.

Examination Report in CA 2,518,623 dated Feb. 16, 2012.

The Future of Trading, ITG QuantEx Brochure, 7 pages, published on or before Feb. 16, 1999.

ITG Platform Brochure, 6 pages, published on or before Feb. 16, 1999.

"Introducing the OptiMark System", Technologies Inc., 17 pages, published on or before Feb. 16, 1999.

ITG POSIT Brochure, 4 pages, published on or before Feb. 16, 1999.

POSIT "Portfolio System for Institutional Trading", User's Guide, 93 pages, published on or before Feb. 16, 1999.

"Single Integrated Architecture" [retrieved on Dec. 5, 2003] Retrieved from the internet <URL :http://www.sungard.com/productsandservices/stars/panorama/solutions/panoramatechnologvandinfrastr.

Senior, Adriana. "Morgan Buying Into Network for On-Line Security Trades" [retrieved on Mar. 25, 2003] Retrieved from the internet <URL :http://proquest.uni.com/pqdlink?index=26&sid=1&srchmode=3&vinst=PROD&fmt=3&st.

Ostrovsky, Arkady. "Working towards a seamless link: Global Protocol" [retrieved on Mar. 25, 2005] Retrieved from the internet <URL : http://proquest.uni.com/pqdlink?index=1&sid=1&srchmode=1&vinst=PROD&fmt=3&sta.

"Case Study: BSE implements intelligent switching architecture Combining networks intelligently" [retrieved on Dec. 5, 2003] Retrieved from the internet <URL :http://www.networkmagazineindia.com/200302/case2.shtml.

"BSE The Stock Exchange, Mumbal Network Diagram" [retrieved on Dec. 5, 2003] Retrieved from the internet <Url : http:/.

Domowitz, Ian. "Electronic Derivatives Exchanges: Implicit Mergers, Network Externalities, and Standardization" The Quarterly Review of Economics and Finance, vol. 35, No. 2, Summer, 1995, p. 163-175.

"Derivatives Drive New Network" Barron's, Nov. 4, 1991: 71, 44: ABLINFORM Global, p. 36.

NYFIX, Inc. Routes OTC Orders to American Stock Exchange [retrieved on Dec. 5, 2003] Retrieved from the internet <URL :http://www.pmewswire.com/cgi-bin/stories.pl?ACCT=SVBIZINK3.story&STORY=/www/story/11-24-2.

"Trading and Decision Support" [retrieved on Dec. 5, 2003] Retrieved from the internet <URL :http://www.sungard.com/prod-ucts_and_services/stars/panoram/solutions/panoramatrading.htm.

"Orc Technology" [retrieved on Dec. 5, 2003] Retrieved from the internet <URL:http://www.orcsoftware.com/Technology/indexhtm.

"Creditex widens access" [retrieved on Mar. 29, 2004] Retrieved from the internet <URL:http://www.efinancialnews.com/index.cfm?. . .On=print_view&passedref=8000000000002212.

Treanor, Jill. "Banks plan trading network for $52 trillion derivatives" [retrieved on Mar. 18, 2004] Retrieved from the internet <URL:http://www.guardian.co.uk/business/story/0,3604, 178019, 00.html.

"OnExchange Selects Exodus to Host Online Derivatives Exchange; Leading Online Derivatives Exchange Optimizes Network Performance by Selecting Leader in Complex Internet Hosting" [retrieved on Mar. 25, 2004] Retrieved from the internet <URL :http://www.findarticles.com/cf_0/m0EIN/2000_Nov_7/66657629/p1/article.jhtml.

"ExNet Network" [retrieved on Dec. 5, 2003] Retrieved from the internet <URL:http://www.orcsoftware.com/Products/ExNetPIPNetwork.htm.

"Orc Futures" [retrieved on Dec. 5, 2003] Retrieved from the internet <URL:http://www.orcsoftware.com/Products/OrcFutures.htm.

"Orc Liquidator" [retrieved on Dec. 5, 2003] Retrieved from the internet <URL:http://www.orcsoftware.com/Products/OrcLiquida-tor.htm.

"Electronic-Trading Newsflashes",dated Dec. 4, 2003, [retrieved on Dec. 5, 2003] Retrieved from the internet <URL:http://www.wstonline.com/printableArticle/;jsessionid=NA3QPNTTNKCOIQSNDBCCK . . .

"Electronic-Trading Newsflashes", dated Sep. 11, 2003, [retrieved on Dec. 5, 2003] Retrieved from the internet <URL:http://www.wstonline.com/printableArticle/;jsessionid=ILJHDTNYRJNVMQSNDBCCKHY?doc id=14. . .

"Press Releases, Leading Derivative Dealers Announce SwapsWire-A Pioneering Interest Rate Derivatives Electronic Dealing Network" dated Apr. 10, 2000, [retrieved on Mar. 18, 2004] Retrieved from the internet <URL:htt;:www.swapswire.com/press/10_04_00.asp.

"Single Integrated Architecture" [retrieved on Dec. 5, 2003] Retrieved from the Internet <URL:htt;:www.sungard.com/products and services/stars/panorama/solutions/panoramatechnologyvandinfrastr.

"The integrated, real-time solution for bank treasure and portfolio management" SunGard Securities Processing. Date of publication unknown, but indicates ©2003.

"Panorama EQN" [retrieved on Dec. 5, 2003] Retrieved from the Internet <URL:htt;:www.sungard.com/products_and_ervices/stars/panorama/solutions/panaromaotcdistribution.htmr.

"Chicago Board of Trade certifies ORC Software for its electronic trading platform" [retrieved on Dec. 5, 2003] Retrieved from the internet <URL:http://www.orcsoftware.com/Company/PNR/PNR 031106 e-shot eng.htm.

"X_Trader Platform" [retrieved on Mar. 3, 2004] Retrieved from the internet URL<http://www.tradingttechnologies.com/bluextrader.html.

"X_Trader TT Net" [retrieved on Dec. 5, 2003] Retrieved from the internet URL<http://www.tradingttechnologies.com/blue_net.html. Introduction to the International Securities Exchange, International Securities Exchange, pp. 1-12, 1999.

Kucemba, Stanley, "Active and Passive Foreign Exchange Risk Management: A Primer", TMA Journal; Nov./Dec. 1996; 6; ABI/INFORM Global, p. 18.

Chacko, George and Das, Sanjiv. "Pricing Interest Rate Derivatives", The Review of Financial Studies, Mar. 2002, 15, 1, ABI/INFORM Global p. 195.

* cited by examiner

302 →

304 → Variable Defined Derivative Product Order 300

306 → Account number: _____

308 → Underlying Contract: _____

310 → Expiration Month: _____

312 → Put or Call: _____

314 → Buy or Sell: _____

316 → Quantity: _____

318 → Strike Price: _____

320 → Delta: _____

322 → Gamma: _____

324 → Vega: _____

326 → Hedge Order: _____

328 → Contingent

330 → ○ Best Efforts

332 → ○ Formula

334 → Standard  ChgUnderlyingPrice*delta+(1/2(ChgUnderlying*gamma)^2)

336 → Custom

Formula: _____

Variables: _____

Figure 3

DERIVATIVES TRADING METHODS THAT USE A VARIABLE ORDER PRICE AND A HEDGE TRANSACTION

The present application is a divisional of U.S. patent application Ser. No. 10/611,458, filed Jul. 1, 2003, which is a continuation-in-part of U.S. patent application Ser. No. 10/385,152, filed Mar. 10, 2003, the entire disclosures of which is hereby incorporated by reference.

FIELD OF THE INVENTION

The present invention relates to derivative product trading methods and systems and, in particular, to methods and systems that utilize a variable defined order price and a hedge transaction.

DESCRIPTION OF THE RELATED ART

Computer systems and networks increasingly are being used to trade securities and derivatives. Computer systems and networks provide several advantages when compared to manual methods of trading. Such advantages include increased accuracy, reduced labor costs and the ability to quickly disseminate market information.

Options are frequently traded via computer systems and methods. An option may be used to hedge risks by allowing parties to agree on a price for a purchase or sale of another instrument that will take place at a later time. One type of option is a call option. A call option gives the purchaser of the option the right, but not the obligation, to buy a particular asset either at or before a specified later time at a guaranteed price. The guaranteed price is sometimes referred to as the strike or exercise price. Another type of option is a put option. A put option gives the purchaser of the option the right, but not the obligation, to sell a particular asset at a later time at the strike price. In either instance, the seller of the call or put option can be obligated to perform the associated transactions if the purchaser chooses to exercise its option or upon the expiration of the option.

Traders typically use theoretical models to determine the prices at which they will offer to buy and sell options. The theoretical option pricing models often produce values that reflect an option's sensitivity to changes in predefined variables. These predefined variables are assigned Greek letters, such as delta, gamma, theta, and vega. Delta is a measure of the rate of change in an option's theoretical value for a one-unit change in the price of the option's underlying contract. Thus, delta is the theoretical amount by which the option price can be expected to change for a change in the price of the underlying contract. As such, delta provides a local measure of the equivalent position risk of an option position with respect to a position in the underlying contract. A "50 Delta" option should change its price 50/100, or ½ a point, for a one point move in its underlying contract.

Gamma is a measure of the rate of change in an option's delta for a one-unit change in the price of the underlying contract. Gamma expresses how much the option's delta should theoretically change for a one-unit change in the price of the underlying contract. Theta is a measure of the rate of change in an option's theoretical value for a one-unit change in time to the option's expiration date. Vega is a measure of the rate of change in an option's theoretical value for a one-unit change in the volatility of the underlying contract. Delta, gamma, and vega are the primary risk management measures used by those who trade in options.

A single option order typically identifies the underlying security, the expiration date, whether the option is a call or a put, the strike price and all other standard order terms (e.g. buy/sell, quantity, account number etc.). Each time the price of the underlying contract changes or one of the variables in the trader's theoretical model changes, a trader may cancel all of the relevant orders, recalculate new order prices and transmit new order prices to the exchange.

It is common for traders of options contracts to hedge risks by purchasing underlying futures contracts. In a pit-traded environment, after executing an options transaction, the trader would typically turn to the futures pit and attempt to execute a hedge transaction. For example, after purchasing 50 call options contracts of eurodollars with a 50 delta strike, the trader would seek to purchase 25 eurodollar futures contracts.

Existing trading systems methods do not allow traders to purchase derivative products, such as options, by providing a variable defined derivative product order price. Such systems also do not allow traders to identify a hedge transaction to be automatically submitted when the derivative product order is filled.

Therefore, there is a need in the art for improved derivative product trading methods and systems that allow traders to use variable defined derivative product order prices and identify corresponding hedge transactions.

SUMMARY OF THE INVENTION

The present invention overcomes the problems and limitations of the prior art by providing methods and systems that utilize a variable defined derivative product order price. Derivative products include options on futures contracts, futures contracts that are functions of or relate to other futures contracts, or other financial instruments that have their price related to or derived from an underlying product. The variable defined derivative product order price may be in the form of a model used to price options. When one of the variables of the model changes, an exchange computer system may recalculate the derivative product's price without requiring the trader to transmit additional or different information to the computer system.

The derivative product order may also identify one or more corresponding hedge transactions or include information that may be used to identify a hedge transaction. The execution of the derivative product order may be contingent on the availability of a hedge transaction. Alternatively, a best efforts approach may be used to fill a hedge transaction order after the execution of the derivative product order.

In one embodiment, advantages of aspects of the present invention are provided by a method of executing a variable priced derivative product order that is contingent on the existence of a corresponding hedge transaction. The method includes receiving at a match system a variable priced order for a derivative product. The variable priced order may include a derivative product identifier, an underlying product identifier and at least one price determination variable. Next, a potential derivative product transaction is identified and a search for a hedge product transaction that corresponds to the potential derivative product transaction is conducted. The derivative product transaction is executed only when a hedge transaction is available.

In another embodiment, advantages of aspects of the present invention are provided by a method of hedging risks associated with the purchase of a variable priced derivative product. The method includes executing, at a match system, a variable priced derivative product order. Order risk data is received from an order risk management module. Next, a best efforts approach is used to locate a potential hedge transaction that corresponds to the derivative product order. Data of the potential hedge transaction is compared to the order risk data. In one implementation, the potential hedge transaction is executed when the order risk data is not exceeded. In other implementations, the potential hedge transaction is executed as long as the order risk data is not exceeded prior to the hedge transaction. In still other implementations, a portion of the hedge transaction is cancelled to prevent exceeding the order risk data.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3 illustrates a variable defined derivative product order in accordance with an embodiment of the invention;

DETAILED DESCRIPTION OF THE INVENTION

Figure 1:
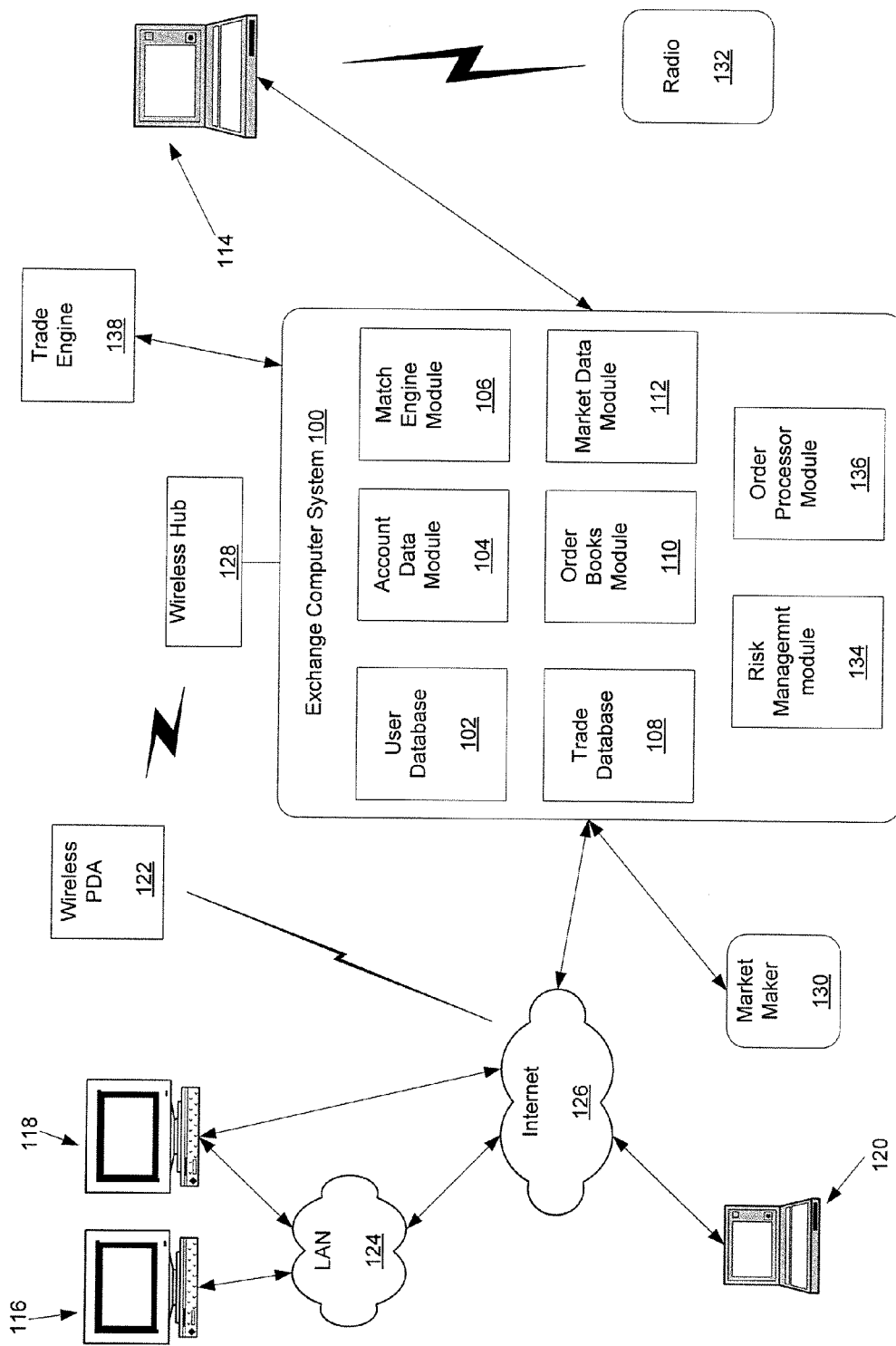
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.)

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit order or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
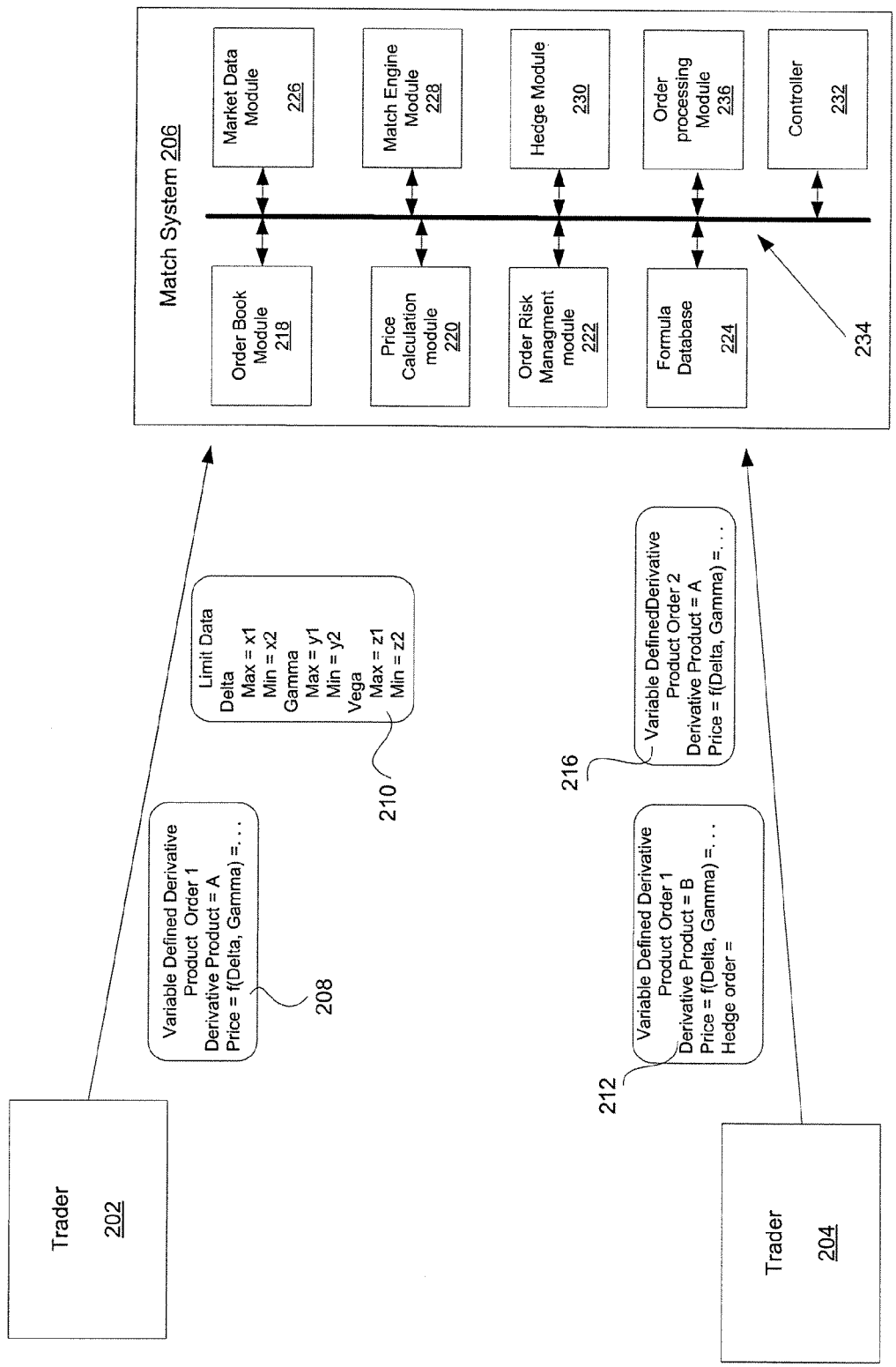
FIG. 2 illustrates a system in which traders exchange information with a match system, in accordance with an embodiment of the invention.

FIG. 2 illustrates a system in which traders 202 and 204 exchange information with a match system 206, in accordance with an embodiment of the invention. Trader 202 is shown transmitting a variable defined derivative product order 208 and a limit data 210 to match system 206. Variable defined derivative product order 208 includes the identification of a derivative product and a variable order price. Variable defined derivative product orders are described in greater detail below in connection with FIG. 3. Limit data 210 may act as a throttle to limit the number of transactions entered into by trader 202. Limited data is also described in greater detail below. Trader 204 transmits derivative product orders 212 and 216 to match system 206. Each trader may transmit several derivative product orders and may associate limit data with one or more of the derivative product orders. As shown in order 212, one or more of the orders may include the identification of a hedge transaction.

Match system 206 may include several modules for determining prices, matching orders and executing transactions. An order book module 218 may be included to maintain a listing of current bid and offer prices. A price calculation module 220 calculates order prices based on price determination variables provided as part of variable defined derivative product orders. Price calculation module 220 may also calculate order prices based on formulas received from traders. For example, derivative product order 208 may include a formula that is a function of an underlying contract, delta and gamma. Price calculation module 220 may be configured to calculate an order price every time the price of the underlying contract changes.

Price calculation module 220 may use a default formula with price determination variable values supplied by a trader. In one embodiment, the change in a derivative product price is equal to a second order Taylor series expansion, such as:

$$\text{ChgUnderlyingPrice} * \text{delta} + (\frac{1}{2}(\text{ChgUnderlyingPrice}^2 * \text{gamma})) \quad (1)$$

wherein ChgUnderlyingPrice is the change in the underlying price. A trader would supply price determination variables delta and gamma and price calculation module would track the derivative product price as the underlying contract changes.

An order risk management module 222 may be included to act as a limit for the user's exposure for a given risk variable as defined by the user. For example, trader 202 provided maximum and minimum delta, gamma and vega values to match system 206. Those values may be stored in order risk management module 222 and computed before executing transactions. Depending on the user's order types and risk utilization for a given risk variable, the user's resting orders for a particular contract may be auto canceled by match system 206 so that the user is no longer at risk to exceed their limits. In addition, and depending on the user's order type and risk utilization for a given risk variable, the user's ability to enter a buy or sell order may be prohibited should the execution of that order cause the user to exceed their particular order risk management limit. Order risk module may be used to limit a user's exposure during the processing of derivative product orders and/or hedge transaction orders.

A formula database 224 may be included to store derivative product order formulas. The formulas may be provided by traders or may be standard formulas provided by an exchange. A market data module 226 may be used to collect and disseminate market data. A match engine module 228 matches bid and offer prices. Match engine module 228 may be implemented with software that executes one or more algorithms for matching bids and offers.

A hedge module 230 may be included to perform hedge transactions based on derivative product transactions. In one embodiment of the invention, hedge module 230 conducts transactions with a trading engine or match system other than match system 206. Hedge module 230 may also perform some or all of the function of risk management module 134 (shown in FIG. 1). Exemplary hedge transactions are described in detail below with references to FIGS. 6 and 7.

An order processing module 236 may be included to decompose delta based and bulk order types for processing by order book module 218 and match engine module 228. A controller 232 may be included to control the overall operation of the components shown coupled to bus 234. Controller 232 may be implemented with a central processing unit. Match system 206 may include modules that perform some or all of the functions of the modules shown in FIG. 1. Moreover, match system 206 may also be coupled to some or all of the elements shown in FIG. 1.

FIG. 3 illustrates a variable defined derivative product order 300 in accordance with an embodiment of the invention. Variable defined derivative product order 300 may include a field 302 for identifying a trader's account number. The underlying contract may be identified in field 304. The expiration month of the derivative product order may be identified in field 306. The order may be identified as a put or a call in field 308 and whether the order is a buy or sell in field 310. The quantity may be identified in field 312 and the strike price may be identified in field 314. Delta, gamma, and vega values may be identified in fields 316, 318 and 320 respectively. Of course, other price determination variables may also be identified as part of a standard variable defined derivative product order.

A hedge transaction may be identified in field 322. The user may choose to make the derivative product order contingent on the existence of an available hedge transaction by selecting radio button 324. The user may also choose to use best efforts to fill the hedge order after the execution of the derivative product order by selecting radio button 326.

The formula for calculating the price of variable defined derivative product order is identified in field 328. The trader can select a standard formula 330 to compute their derivative product price or select a custom formula 332. In one embodiment, a standard formula is supplied by or sponsored by an exchange. When a custom formula is selected, the trader may also provide a formula in field 334 and the variables in field 336. In one implementation of the invention, variable defined derivative product order 300 is created in the form of an XML for HTML document created by one of the computer devices shown in FIG. 1. Variable defined derivative product order 300 may be encrypted before being transmitted to an exchange. Of course one or more additional or alternative fields may be included. For example, a reference price may be included to protect against in flight conditions when the reference price changes while variable defined derivative product order 300 is in transit.

Figure 4:
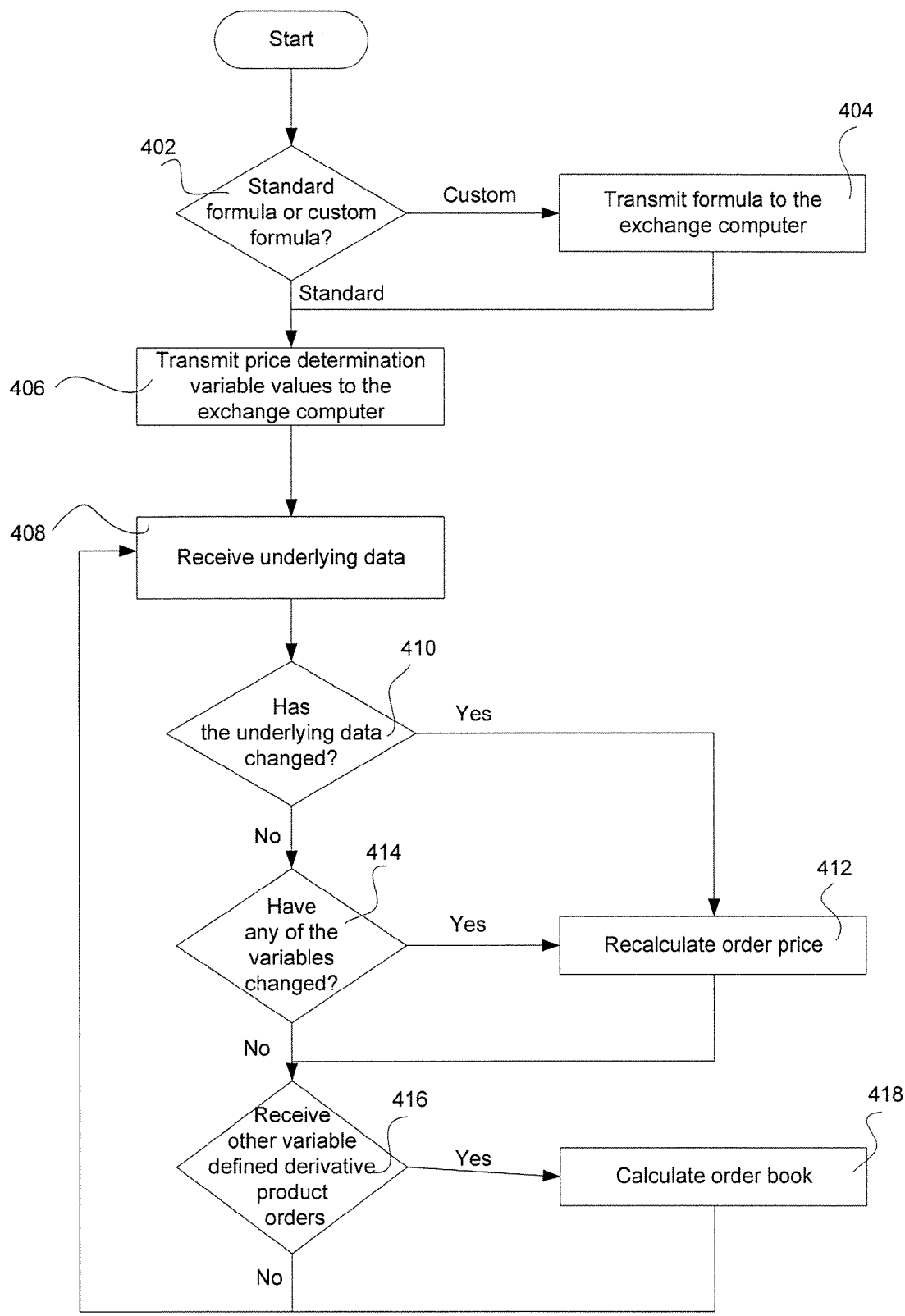
FIG. 4 illustrates a computer implemented method of trading a derivative product contract that involves the use of a variable order price, in accordance with an embodiment of the invention.

FIG. 4 illustrates a computer-implemented method of trading a derivative product contract that involves the use of a variable order price, in accordance with an embodiment of the invention. First, in step 402 it is determined whether the trader desires to use a standard exchange sponsored formula. When the trader uses a custom formula, the formula is transmitted to the exchange computer in step 404. Step 404 may also include the trader or exchange transmitting the formula to other market participants. In step 406, the trader transmits price determination variable values for the standard formula to an exchange computer. For example, step 406 may include transmitting delta and gamma values to an exchange computer. In step 408 the trader receives underlying data. The underlying data may include current bid and offer prices for underlying put and call futures contracts.

In step 410 it is determined whether the underlying data has changed. The price of an underlying contract may change multiple times per second. When the underlying contract data has changed, in step 412 the trader's computer device may recalculate the order price of their delta based order and all other delta based orders from other users based on current data. In step 414, it is determined whether any of the price determination variables used in the formula to calculate the order price have changed. The price determination variables may include delta, gamma, and vega. When the price determination variables have changed, in step 412, the order price is recalculated. Of course, step 412 may be performed based on changes in current underlying contract data and variables. The order price may be displayed to the trader or plotted on a graph that tracks order prices.

Some of the advantages of aspects of the present invention are that they allow traders to maintain an order book and limit the amount of information that must be disseminated by an exchange computer or match system. In particular, an exchange computer or match system may transmit a plurality of variable defined derivative product orders to several different traders only when other derivative product order users establish their initial positions. Thereafter, the exchange computer may then only transmit underlying data or other data used to calculate variable defined derivative product order prices. Each trader computer may then periodically calculate current order prices based on information received from the exchange computer. For example, in step 416 it is determined whether other variable defined derivative product orders are received. When variable defined derivative product orders are received, in step 418 the trader computer may calculate new order book listings for current bids and offers related to variable defined derivative product based orders. The order book may be displayed to the trader in any one of a variety of conventional formats. After step 418, control returns to step 408.

Figure 5:
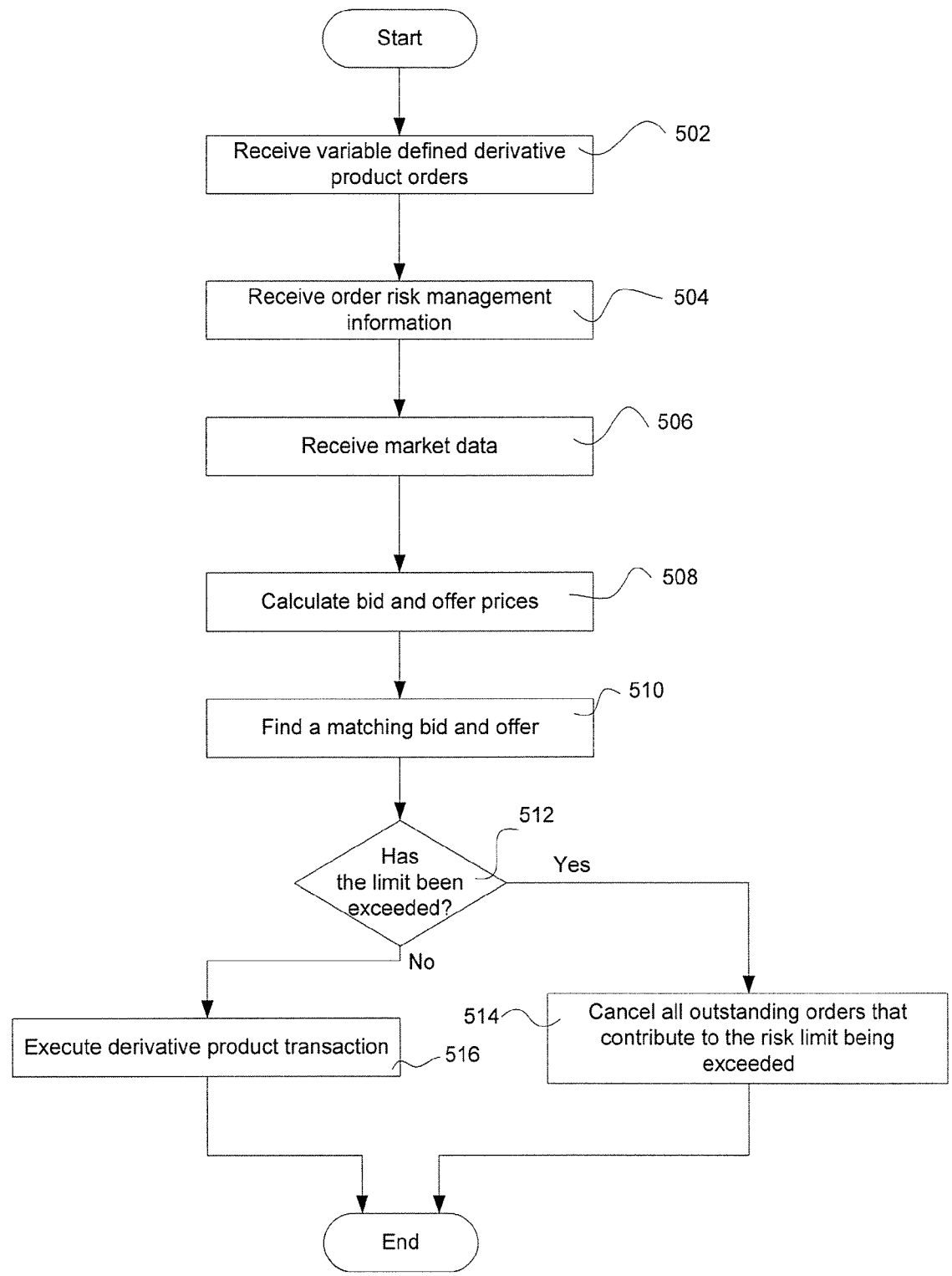
FIG. 5 illustrates a method of processing variable defined derivative product orders by an exchange computer, in accordance with an embodiment of the invention, when the variable defined derivative product orders do not include the identification of hedge transactions.

FIG. 5 illustrates a method of processing variable defined derivative product orders by an exchange computer, in accordance with an embodiment of the invention, when the variable defined derivative product orders do not include the identification of hedge transactions. First, in step 502 the exchange computer receives variable defined derivative product orders. As described above, the variable defined derivative product orders may be in the form of one or more formulas containing one or more price determination variables. In step 504, the exchange computer may receive order risk management information to limit the trader's exposure for a particular risk variable as given by the trader. Next, the exchange computer may receive or otherwise produce market data in step 506. The market data may include current underlying prices that may be used to calculate variable defined derivative product order prices. In step 508, bid and offer prices are calculated. The calculations may be based on a combination of formulas and variables provided by traders and/or the exchange. In step 510 the exchange computer finds a matching bid and offer. A matching bid and offer may be found by match engine 228. Before executing a transaction, in step 512 it is determined whether one or more order risk management limits provided by the trader have been exceeded. When a limit has been reached, all outstanding orders that contribute to the risk limit being exceeded further are automatically cancelled by the computer system in step 514. When the limits have not been exceeded, in step 516 the derivative product transaction is executed. Of course, an exchange computer may be configured to repeat the method shown in FIG. 5 several times.

Figure 6:
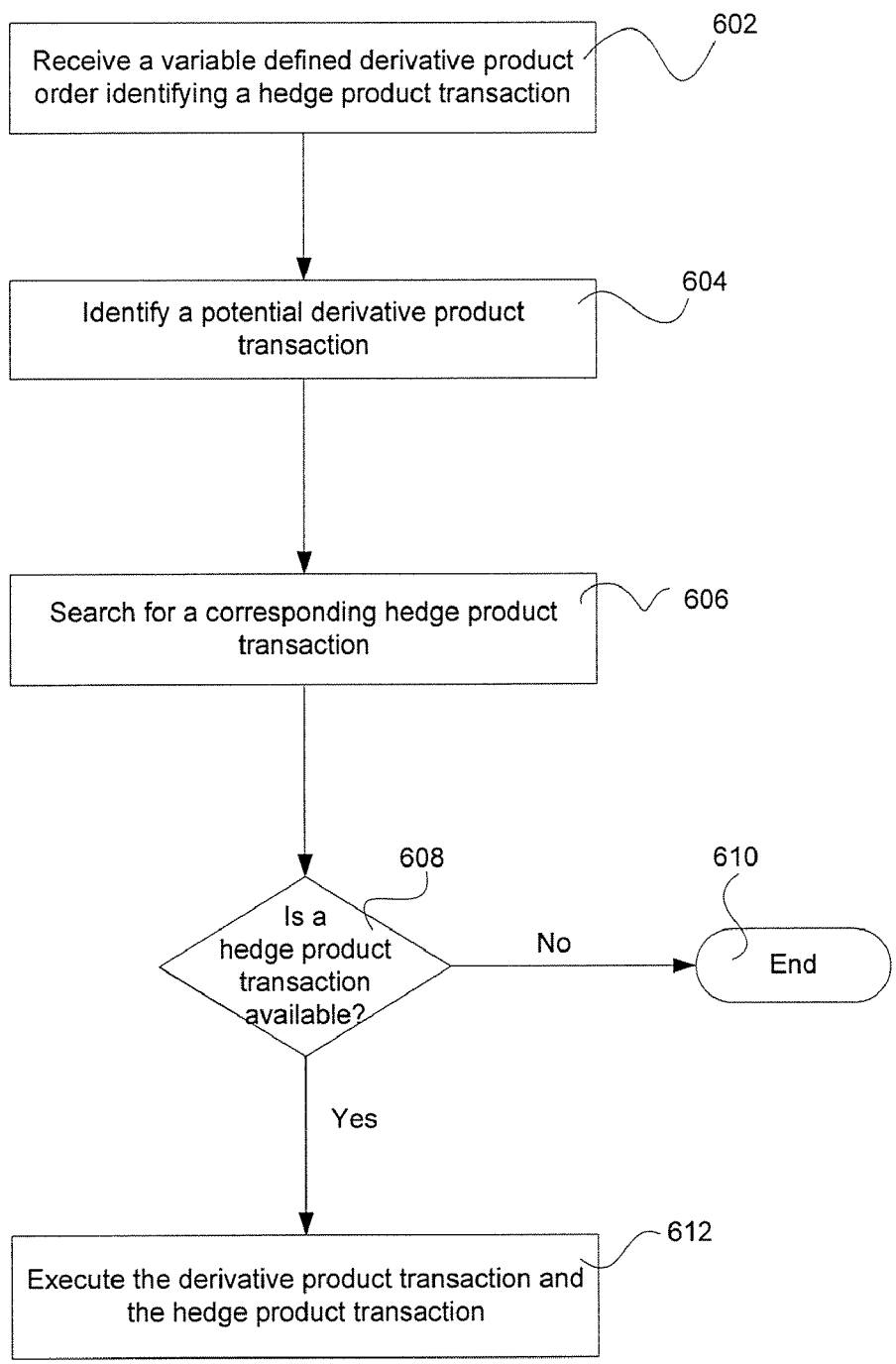
FIG. 6 illustrates a method of processing variable defined derivative product orders that are contingent on the existence of hedge transactions, in accordance with an embodiment of the invention.

FIG. 6 illustrates a method of processing variable defined derivative product orders that are contingent on the existence of hedge transactions, in accordance with an embodiment of the invention. First, in step 602 a variable defined derivative product order is received. The order received in step 602 is preferably received at a match system and may identify a hedge product transaction. Next, a potential derivative product transaction is identified in step 604. Step 604 may include calculating a price of the derivative product order using aspects of the invention described above. Step 606 includes searching for a corresponding hedge product transaction. The hedge product transaction is one that hedges against the risks associated with the variable defined derivative product transaction. In one embodiment of the invention, step 606 includes searching for the hedge product transaction in the same match system as a match system used for the derivative product transaction. The use of the same match system facilitates locking in both the hedge product transaction and the derivative product transaction before execution of either transaction. In an alternative embodiment, the search for hedge product transaction takes place in a different match system.

Next, in step 608 it is determined whether the hedge product transaction is available. Step 608 may include determining whether the hedge product transaction satisfies predetermining criteria provided by the user or match system. When the hedge transaction is not available, in step 610 the derivative product execution does not occur and the process ends. When the hedge product transaction is available, in step 612 the derivative product transaction and hedge product transaction are both executed. The hedge transaction and the hedge product transaction may be locked in and executed by the same match system.

Figure 7:
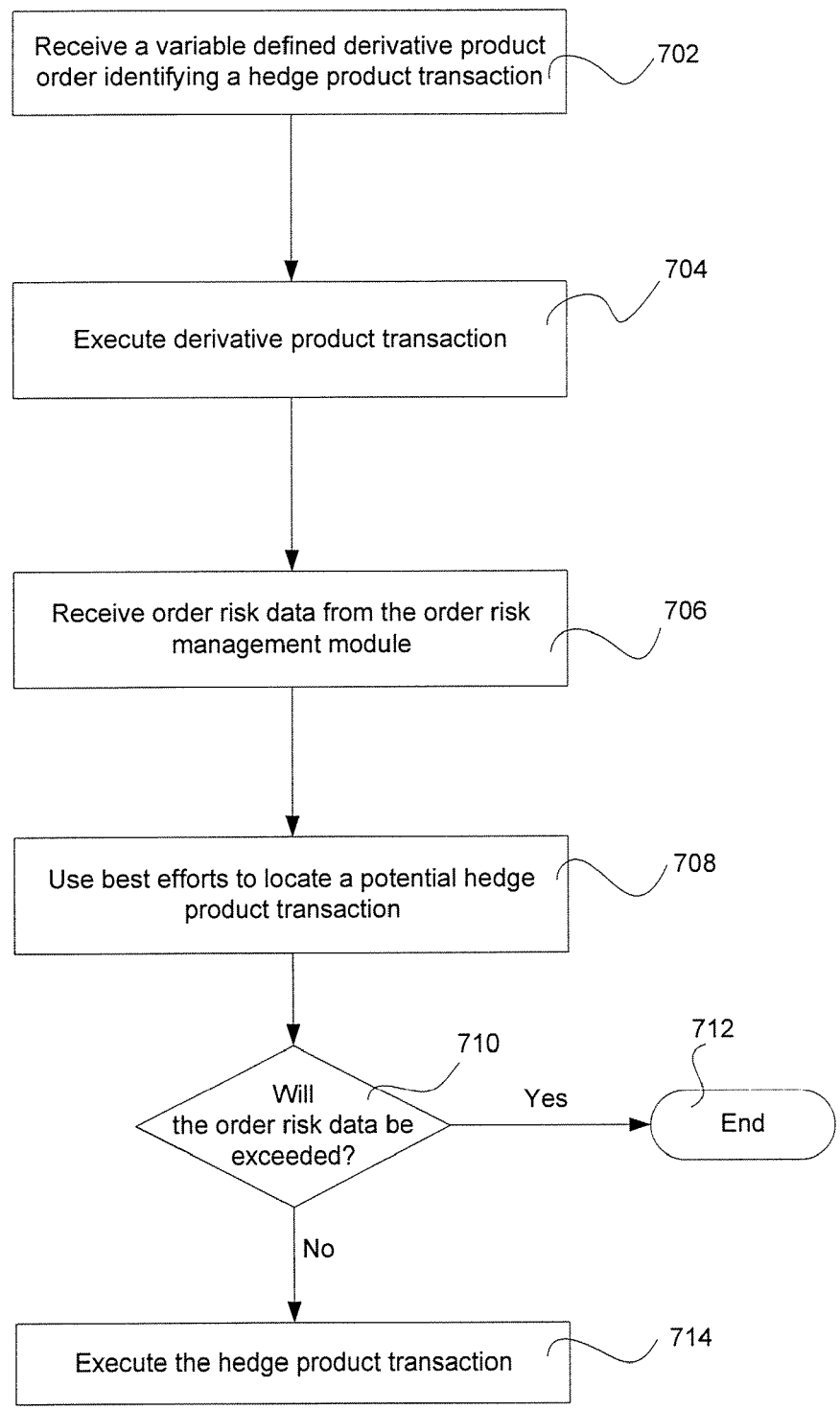
FIG. 7 illustrates a method of processing variable defined derivative product orders that require a best efforts approach to finding hedge transactions, in accordance with an embodiment of the invention.

FIG. 7 illustrates a method of processing variable defined derivative product orders that require a best efforts approach to finding hedge transactions, in accordance with an embodiment of the invention. First, in step 702 a match system receives a variable defined derivative product order. The derivative product order may identify a hedge product transaction. Next, in step 704 the derivative product transaction is executed. Step 704 may include aspects of the invention described above. In particular, the execution of the derivative product transaction may include calculating a variable defined derivative product order price.

In step 706 the match system receives order risk data from an order risk management module, such as order risk management module 222 shown in FIG. 2. The order risk data may include maximum and/or minimum delta and/or gamma values, described above. Next, in step 708 a best efforts approach is used to locate a potential hedge product transaction. The potential hedge transaction may comprise the fill or kill transaction. In one alternative embodiment, that transaction may comprise a fill and kill transaction. Next, in step 710 it is determined whether the order risk data has been exceeded. Step 710 may include comparing the order risk data received in step 706 to data relating to the potential hedge transaction. When the order risk data would be exceeded, all of the user's risk increasing orders are canceled and the process ends in step 712. When the order risk data would not be exceeded, in step 714 the hedge product transaction is executed.

The method shown in FIG. 7 illustrates one exemplary method in which a potential hedge transaction will not be executed if the potential transaction would cause the risk data to be exceeded. In other embodiments, only a portion of the potential hedge transaction is executed. For example, if the potential hedge transaction involves 100 contracts and the $52^{nd}$ contract would cause the risk data to be exceeded, a match system would execute a trade for either 51 or 52 contracts. In another alternative embodiment, the match system will execute the entire potential hedge transaction as long as the risk data is not exceeded just prior to execution of the potential hedge transaction, regardless of whether risk data will be exceeded after the transaction.

Figure 8:
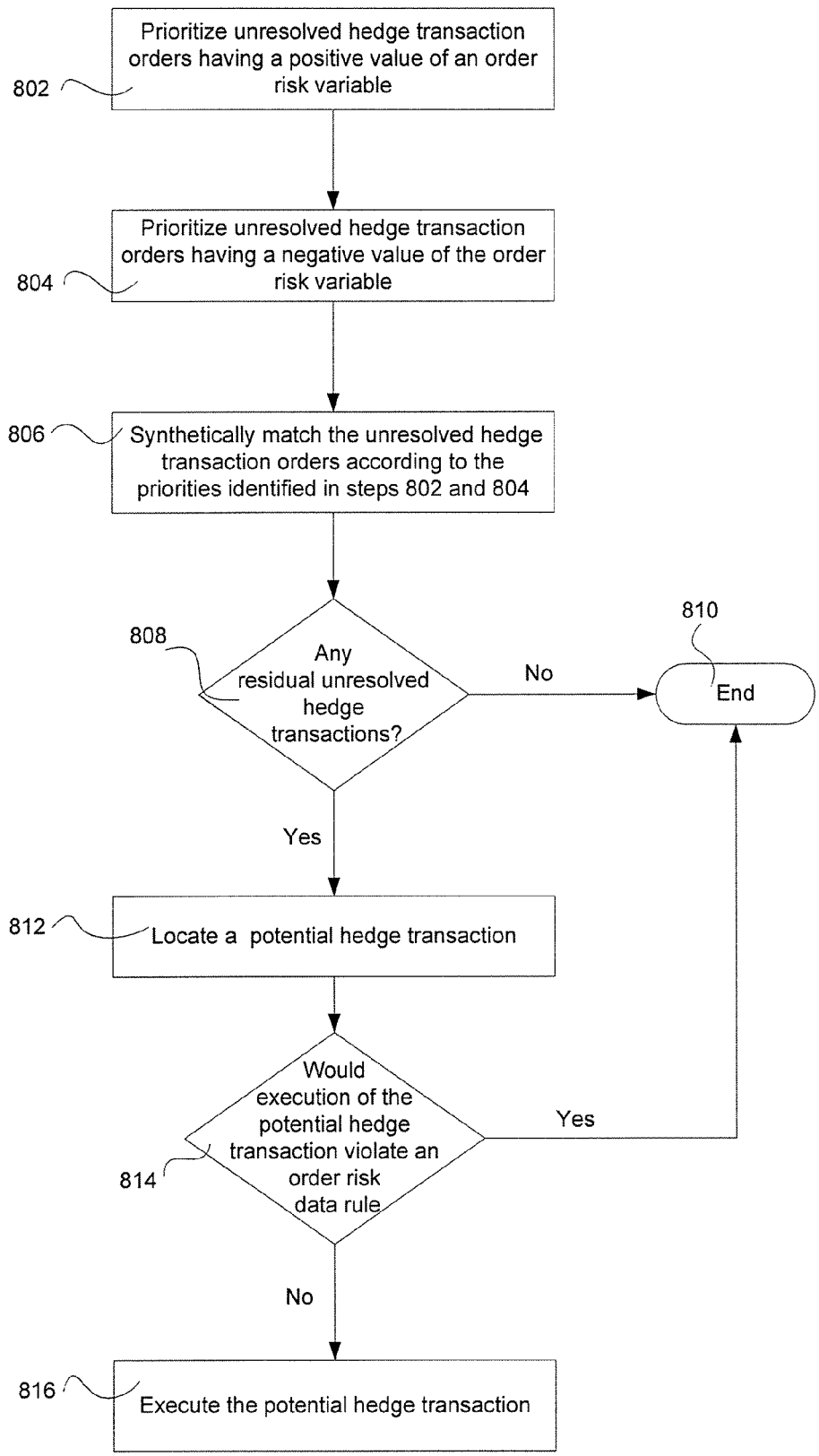
FIG. 8 illustrates a method of synthetically matching unresolved hedge transaction orders for orders belonging to a common class, in accordance with an embodiment of the invention.

A trader may buy or sell several variable defined derivative product contracts in a common class and have a need for multiple hedge transactions. FIG. 8 illustrates a method of synthetically matching unresolved hedge transaction orders for orders belonging to a common class. First in step 802, unresolved hedge transaction orders having a positive value of an order risk variable are prioritized. The priority may be based on the magnitudes of the order risk variable. As described above, one order risk variable is delta. In step 804 the unresolved hedge transaction orders having a negative value of the order risk variable are prioritized. Next, in step 806 the unresolved hedge transaction orders are synthetically matched according to the priorities identified in steps 802 and 804.

After the synthetic matching, in step 808 it is determined whether any residual unresolved hedge transactions exist. When none exist, the process ends in step 810. When one or more residual unresolved hedge transactions exist, a potential hedge transaction is located in step 812. Next, in step 814 it is determined whether the execution of the potential hedge transaction would violate an order risk data rule. Of course step 814 may include determining whether or not the potential hedge transaction would violate more than one order risk data rule. Exemplary order risk data rules have been described above. When the rule would be violated, the process ends in step 810. When the rule would not be violated, the potential hedge transaction is executed in step 816.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, while aspects of the present invention have been described in connection with the trading of derivative products, in other embodiments, aspects of the invention may be used in connection with the trading of securities, such as debt, foreign exchange, and equity contracts, and other instruments for which options or other derivative instruments are traded. Moreover, aspects of the invention may be used with over the counter market transactions. Hedge transactions may include over the counter trades or exchange traded contracts. One example of an over the counter trade is a forward contract.

What is claimed is:

1. A method of synthetically matching unresolved hedge transaction orders for orders belonging to a common class, the method comprising:
    (a) prioritizing unresolved hedge transaction orders having a positive value of an order risk variable according to values of the order risk variable;
    (b) prioritizing unresolved hedge transaction orders having a negative value of the order risk variable; and
    (c) at a computer system operated by an exchange synthetically matching the unresolved hedge transaction orders according to the priorities identified in (a) and (b).

2. The method of claim 1, further including:
    (d) identifying any residual unresolved hedge transactions that remain after (c); and
    (e) when at least one residual unresolved hedge transaction exists, locating at least one potential hedge transaction.

3. The method of claim 2, further including:
    (f) executing the potential hedge transaction when an order risk data rule is not violated.

4. The method of claim 3, wherein the rule in (f) requires that the order risk data not be exceeded after the potential hedge transaction.

5. The method of claim 3, wherein the rule in (f) requires that the order risk data not be exceeded before the potential hedge transaction.

6. The method of claim 3, wherein the potential hedge transaction includes a plurality of contracts and (f) comprises:
    (i) identifying the lowest number of the contracts that will cause the order risk date to be exceeded; and
    (ii) executing a transaction that includes the number of contracts identified in (i).

7. The method of claim 3, wherein the potential hedge transaction includes a plurality of contracts and (f) comprises:
    (i) identifying the lowest number of the contracts that will cause the order risk date to be exceeded; and
    (ii) executing a transaction that includes one less than the number of contracts identified in (i).

* * * * *